Figure 1:
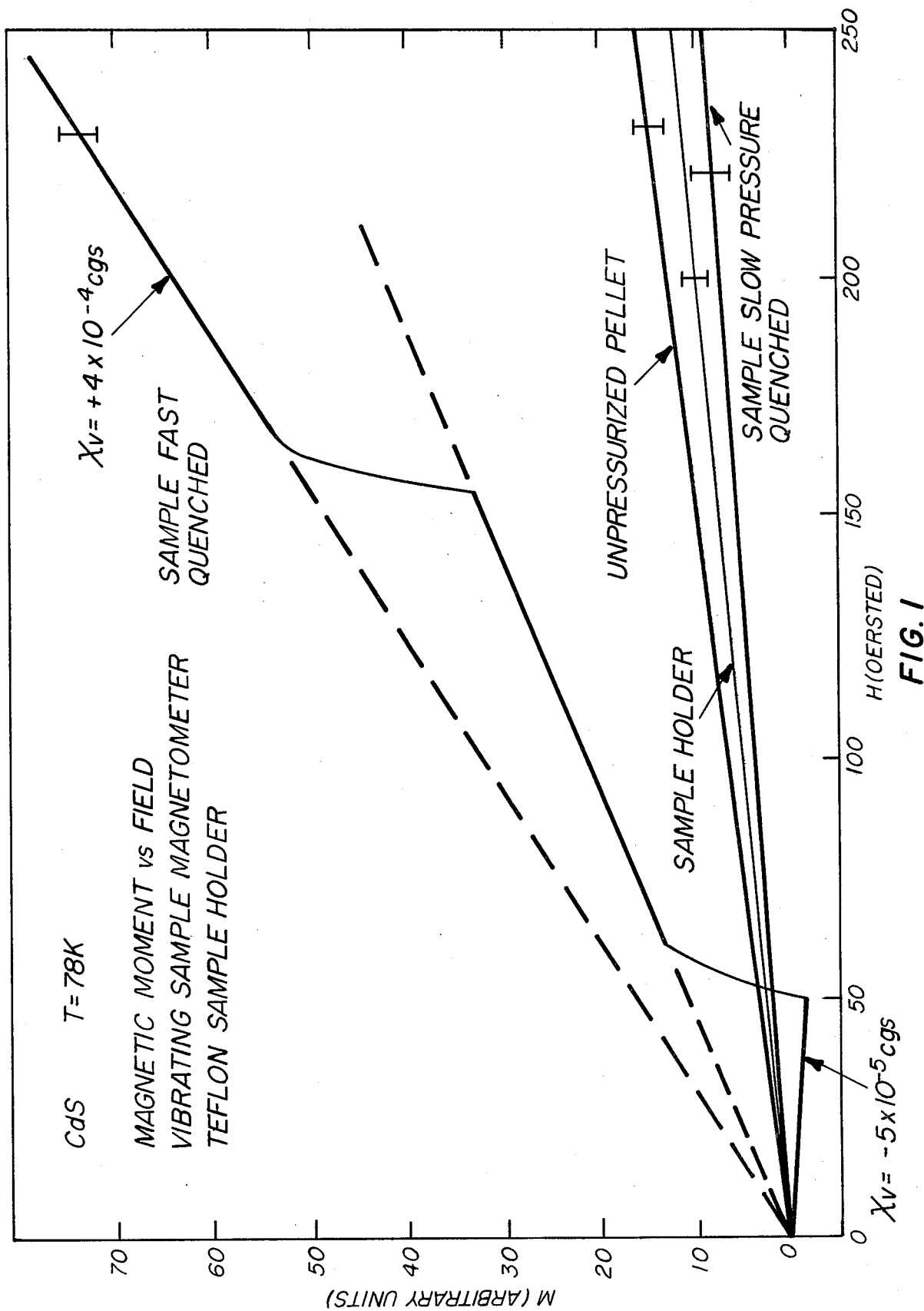

United States Patent [19]
Homan et al.

[11]  4,450,086
[45]  May 22, 1984

[54] PRODUCTION OF CADMIUM SULFIDE COMPOSITIONS HAVING UNUSUAL MAGNETIC AND ELECTRICAL PROPERTIES

[75] Inventors: Clarke G. Homan, Schenectady; David P. Kendall, Brunswick; Robert K. MacCrone, Colonie, all of N.Y.

[73] Assignee: The United States of America as represented by the Secretary of the Army, Washington, D.C.

[21] Appl. No.: 283,714

[22] Filed: Jul. 16, 1981

[51] Int. Cl.$^3$ .................... C04B 35/00; C01G 11/02
[52] U.S. Cl. ................... 252/62.51; 252/62.3 ZT; 252/518; 423/561 B
[58] Field of Search ............ 423/561 B; 252/62.51, 252/62.3 ZT, 501.1, 518

[56] References Cited

U.S. PATENT DOCUMENTS 3,058,807  10/1962  Sedgwick .................. 423/561 B

FOREIGN PATENT DOCUMENTS 52-58542  5/1977  Japan .................. 423/561 B

OTHER PUBLICATIONS

Sato, "Applied Physics" (Japan), vol. 35, No. 6, 1966, pp. 388–392.
Horman et al., "Solid State Communications" 32, pp. 521–524 (1979).

*Primary Examiner*—Jack Cooper
*Attorney, Agent, or Firm*—Robert P. Gibson; Anthony T. Lane; A. Victor Erkkila

[57] ABSTRACT

Process for preparing cadmium sulfide compositions which are in a metastable state possessing greatly increased electrical conductivity and magnetic properties. The process comprises pressure quenching a cadmium sulfide composition containing between about 0.5% and 3.0% by weight chlorine, obtained by precipitation of CdS from aqueous $CdCl_2$ solution with $H_2S$, to produce a precipitate containing a mixture of CdS and a complex compound of $CdCl_2$ and CdS, which is washed with water to remove uncomplexed $CdCl_2$. The pressure quenching treatment involves suddenly releasing the cadmium sulfide composition from a high pressure of at least 32 K bars at rates of at least $10^4$ bars/sec.

4 Claims, 2 Drawing Figures

PRODUCTION OF CADMIUM SULFIDE COMPOSITIONS HAVING UNUSUAL MAGNETIC AND ELECTRICAL PROPERTIES

GOVERNMENTAL RIGHTS

The invention described herein may be manufactured, used and licensed by or for the Government for Governmental purposes without payment to us of any royalty thereon.

BACKGROUND OF THE INVENTION

It has been recently discovered that by submitting certain cadmium sulfide semiconducting compositions to a "pressure quenching treatment", wherein the composition is compressed under a high pressure of 40K bars or higher and the pressure is suddenly released at rates in excess of $10^4$ bars/sec. at room temperature, the composition is transformed into a new metastable state, which possesses different mechanical, optical, electrical and magnetic properties than those of the starting composition. The product thus obtained is black in color, contains a lenticular platelet structure, has a structural morphology containing some retained NaCl phase, possesses an increased electrical conductivity by approximately four orders of magnitude, and exhibits both strong negative (diamagnetic) and positive (paramagnetic) magnetism, which varies with the applied magnetic field and other physical treatments (C. G. Homan, D. P. Kendall and R. K. MacCrone, Solid State Communications, 32, 521 (1979); E. Brown, C. G. Homan and R. K. MacCrone, Physical Review Letters, 45, 478 Aug. 11, 1980).

The experiments reported in the cited publications were carried out by pressure quenching commercial samples of cadmium sulfide compositions. It was found that pressure quenched product produced from cadmium sulfide sample obtained from one commercial source showed the aforesaid strong diamagnetic and paramagnetic properties, whereas the pressure quenched product produced from a cadmium sulfide sample from another commercial source showed markedly weaker diamagnetic and paramagnetic properties. Elemental analysis showed that the cadmium sulfide samples from these different commercial sources differed only slightly in content of impurities. Consequently, it was not known what element or combination of elements present as impurities in the cadmium sulfide compositions were critical for the production of a material which on pressure quenching yielded a cadmium sulfide product having the unusual magnetic and electrical conducting properties.

Therefore, it is the principal object of the present invention to produce cadmium sulfide compositions having the aforesaid unusual properties by a process consisting of a chemical precipitation reaction followed by a pressure quenching operation.

SUMMARY AND DETAILED DESCRIPTION OF THE INVENTION

We have discovered a novel process for producing a cadmium sulfide composition which is in a metastable state possessing large diamagnetism and greatly increased electrical conductivity. The process comprises pressure quenching a cadmium sulfide composition containing about 0.5% and 3.0% by weight of chlorine, obtained by precipitating CdS from an aqueous $CdCl_2$ solution with $H_2S$, thereby producing a precipitate containing a mixture of CdS and a complex compound of CdS and $CdCl_2$ together with adhering uncomplexed $CdCl_2$, and washing the precipitate with water to remove uncomplexed $CdCl_2$.

The novel process can be carried out in the manner described below.

Cadmium chloride containing not more than about 100 ppm of total metallic impurities, and less than 30 ppm of magnetic impurities, is dissolved in water to produce a solution, preferably of between 0.3 and 1.0 normality. Hydrogen sulfide gas of high purity is bubbled through the solution to react with the cadmium chloride to form a precipitate of cadmium sulfide. During this reaction some cadmium chloride is co-precipitated in the form of a chemical complex with cadmium sulfide. The amount of cadmium chloride thus complexed with cadmium sulfide depends on a number of factors, such as the normality of the aqueous cadmium chloride solution and rate of introduction of hydrogen sulfide gas. The precipitate thus obtained is separated from the solution by filtration and the filter cake is washed with water to remove uncomplexed cadmium chloride and dried. By washing the precipitate with water at ordinary temperature, any cadmium chloride not present in the form of a chemical complex with cadmium sulfide can be removed. In this manner cadmium sulfide compositions desirably containing between about 0.5% and 3.0% by weight of chlorine can be obtained.

If further washing cannot measurably reduce the chlorine concentration, it can be assumed that essentially all of the chlorine present is in the form of the complex.

The cadmium sulfide: cadmium chloride semiconducting complex can be identified by the greatly diminished hygroscopicity normally observed with simple mixtures of cadmium sulfide and cadmium chloride having the same chemical composition. The cadmium sulfide: cadmium chloride complex can also be identified by a broad decomposition exotherm in the 350° C.–450° C. range, where the complex decomposes to a mixture of cadmium sulfide and cadmium chloride. (The magnitude is about 2 cal/gm for a sample containing about 0.7% by weight of chlorine.) The presence of cadmium chloride after such decomposition is evidenced by the appearance of cadmium chloride lines in the X-ray pattern after heating the sample above 450° C. but below the eutectic melting temperature at about 535° C. Heating the complex up to the decomposition temperatures, but not above, produces line sharpening of the as-precipitated cadmium sulfide X-ray pattern. The composition products heated to above 535° C., say 600° C., also produce the sharp endothermic peak associated with the eutectic melting of a mixture of cadmium sulfide and cadmium chloride. (The magnitude is about 0.5 cal/gm for a complex containing about 1% by weight of chlorine and varies directly with the chlorine content within the eutectic melting range.) The existence of such a complex has been suggested by R. O. Miller, F. Dachille, and R. Roy, Journal of Applied Physics, 37, 4913 (1966).

By heating to above 450° C., the complex is decomposed into cadmium sulfide and cadmium chloride, from which the readily water-soluble cadmium chloride can be removed by washing with water. On heating the complex to above 535° C., specifically 600° C., all of the cadmium chloride is volatilized and condenses on the cooler surfaces, and the resulting cadmium sulfide product showed no evidence of cadmium chloride in the X-ray patterns.

We have found that cadmium sulfide semiconducting compositions thus obtained containing between about 0.5% and 3.0% and especially between about 0.5% and 1.5% by weight of chlorine, when subjected to the aforesaid pressure quenching treatment, are converted to products having the aforementioned unusual magnetic and electrical conductance properties to a high degree. However, cadmium sulfide compositions similarly prepared but containing substantially less than 0.5% by weight chlorine (e.g. 0.02%) or substantially more than 3.0% (e.g. 6%) chlorine on pressure quenching do not show the desired magnetic or electrical properties. Also, we have found that the unusual magnetic and electrical properties are not obtained by similarly pressure quenching a composition prepared by mixing pure cadmium sulfide and pure cadmium chloride powders in the proportions to produce a chlorine content of the desired range, e.g. 1% by weight.

The reaction of hydrogen sulfide with an aqueous cadmium chloride solution can be carried out at temperatures ranging from about 10° C. to 100° C., and conveniently at ambient temperature and preferably using at least one mole of hydrogen sulfide per mole of cadmium sulfide. Preferably, the cadmium chloride employed contains not more than about 100 ppm of total metallic impurities, and specifically not more than about 30 ppm of magnetic impurities, and the water employed for the solution or wash water is preferably distilled or deionized water.

The following example illustrates a specific embodiment of the method of carrying out the process of the present invention.

Cadmium chloride containing not more than 100 ppm of total metallic impurities is dissolved in distilled water to produce a 0.5 normal solution (9.2 grams in 100 milliliters water) of cadmium chloride. Hydrogen sulfide gas (C.P. Grade, 99.5% pure) is bubbled into the solution at room temperature through a standard 0.5 inch fritted tube using a supply pressure of 10 psi, until a color change in the precipitate from orange to yellow is noted. The resulting orange precipitate is separated from the solution by filtration, and the filter cake is washed with about 100 milliliters of distilled water per gram of precipitate at room temperature and dried at a temperature of about 100° C. The cadmium sulfide composition thus obtained contains about 0.7% by weight of chlorine present as cadmium chloride in chemical combination with cadmium sulfide, as noted above.

The cadmium sulfide composition is pressure quenched in the following manner described in the cited references, using a compacted powder disc-shaped sample of approximately 2.5 mm in diameter by 0.5 mm in thickness. Pressurization is effected in a gasketed Bridgeman anvil device using cemented tungsten carbide anvils and pyrophyllite gaskets. Force is applied to the anvils by means of a servo-hydraulic mechanical testing machine. The sample pressure is increased at any convenient rate to 4.0 GPa, until the physical property change (in this case, a large change in resistance and the phase transition to the NaCl structure) is observed. The electrical resistance change is measured through the anvils and has the value of $10\pm2$ ohms. The pressure is then decreased at a rate such that zero pressure is reached in a time of $0.008\pm0.005$ second. This technique gives an average rate of pressure decrease in the sample of approximately $5\times10^{11}$ Pa/sec.

Figure 2:
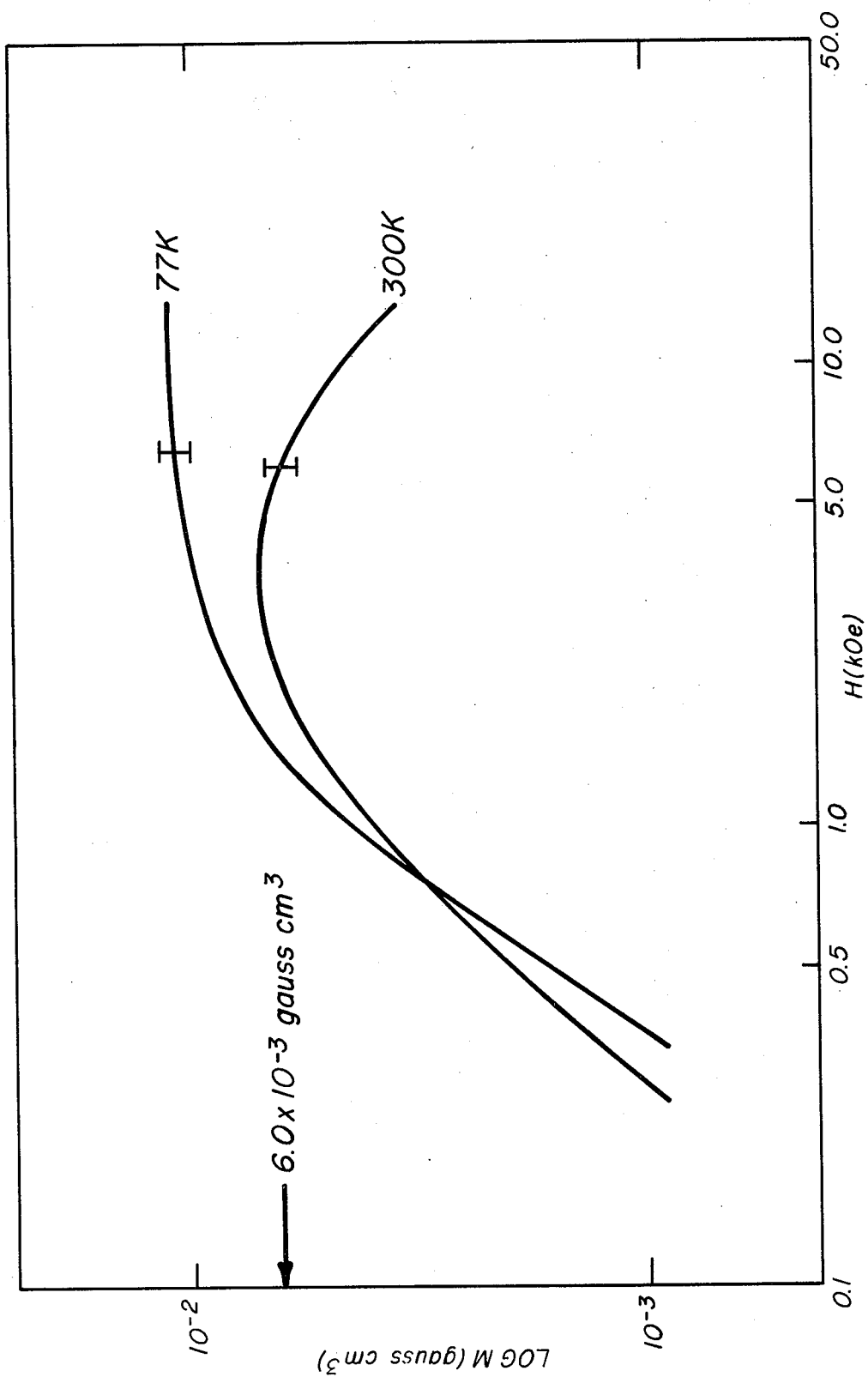

Immediately following the above pressure quenching process, the CdS composition has transformed into a new, metastable state which has different mechanical, optical, electrical and magnetic properties than those of the starting material. It is black in color, contains a lenticular platelet structure, has a structural morphology containing some retained NaCl phase, has an increased electrical conductivity at room temperature by approximately four orders of magnitude compared with the starting material and exhibits both strong negative (diamagnetic) and positive (paramagnetic) magnetism with varies with applied magnetic field and other physical treatment. FIG. 1 shows schematically the strong diamagnetic and paramagnetic properties of the pressure quenched CdS composition thus obtained while FIG. 2 shows the low and high field behavior thereof at 77° K. and 300° K. for a sample volume of $3\times10^{-3}$ cubic centimeters.

The term "pressure quenching", as used in the specification and claims, is understood to mean compressing the CdS composition under a high pressure of at least 32K bars (3.2 $GP_a$) and suddenly releasing the pressure at a rate of at least $10^4$ bars/sec.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

We claim:

1. A process for producing a cadmium sulfide composition which has a black color, contains lenticular platelets, has a structural morphology containing retained high pressure NaCl phase, and exhibits increased electrical conduction and large diamagnetism and large paramagnetism, which comprises pressure quenching a cadmium sulfide composition containing between about 0.5% and 3.0% by weight chlorine obtained by precipitation from an aqueous cadmium chloride solution with hydrogen sulfide to produce a precipitate consisting essentially of a mixture of cadmium sulfide and a complex compound of cadmium sulfide and cadmium chloride together with adhering uncomplexed cadmium chloride, and washing the precipitate with water to remove uncomplexed cadmium chloride.

2. A process according to claim 1, wherein the precipitation is from an aqueous cadmium chloride solution which is between about 0.2 and 1.0 normal.

3. A process according to claim 1, wherein the cadmium sulfide composition contains about 0.5% and 1.5% by weight chlorine.

4. A process according to claim 3, wherein the precipitation is from an aqueous cadmium chloride solution which is between about 0.4 and 0.8 normal.

* * * * *